US012413125B2

(12) United States Patent
Questad

(10) Patent No.: US 12,413,125 B2
(45) Date of Patent: Sep. 9, 2025

(54) RECIPROCATING MAGNETIC MOTOR

(71) Applicant: Randy Questad, Battle Ground, WA (US)

(72) Inventor: Randy Questad, Battle Ground, WA (US)

( * ) Notice: Subject to any disclaimer, the term of this patent is extended or adjusted under 35 U.S.C. 154(b) by 222 days.

(21) Appl. No.: 18/485,746

(22) Filed: Oct. 12, 2023

(65) Prior Publication Data

US 2025/0125698 A1    Apr. 17, 2025

(51) Int. Cl.
*H02K 33/00* (2006.01)

(52) U.S. Cl.
CPC .................................. *H02K 33/00* (2013.01)

(58) Field of Classification Search
CPC ........ H02K 33/00; H02K 35/02; H02K 35/00; H02K 35/04; H02K 41/02; H02K 41/031
USPC ............... 310/20, 12.12, 12.15, 12.01; 290/4
See application file for complete search history.

(56) References Cited

U.S. PATENT DOCUMENTS

| | | | | |
|---|---|---|---|---|
| 5,446,319 A * | 8/1995 | Pawlowski | ............ | H02K 33/00 318/135 |
| 6,060,804 A * | 5/2000 | Fujita | ............... | B06B 1/045 310/12.32 |
| 6,326,706 B1 * | 12/2001 | Zhang | ............. | F04B 35/045 310/12.32 |
| 7,402,929 B1 * | 7/2008 | Dilliner | ............. | H02K 53/00 310/154.34 |
| 7,446,440 B2 * | 11/2008 | Mihajlovic | ............ | H02K 53/00 310/20 |
| 7,498,681 B1 * | 3/2009 | Kellogg | .............. | H02K 35/02 290/1 R |
| 7,557,473 B2 * | 7/2009 | Butler | ................ | H02K 7/075 310/20 |
| 7,710,227 B2 * | 5/2010 | Schmidt | ............. | H02K 35/02 310/171 |
| 9,240,267 B2 * | 1/2016 | Nagahara | ............ | H02K 35/02 |
| 11,114,926 B2 * | 9/2021 | Delette | ............... | H02K 35/02 |
| 11,732,769 B2 * | 8/2023 | Clymer | .............. | H02K 49/106 188/267 |

(Continued)

FOREIGN PATENT DOCUMENTS

KR    101306147 B1 *  9/2013    ............. H02K 53/00

OTHER PUBLICATIONS

KR-101306147-B1 English Translation.*

*Primary Examiner* — Maged M Almawri
(74) *Attorney, Agent, or Firm* — Mark S Hubert

(57) ABSTRACT

A magnetic reciprocating motor that has a vertically aligned stack of three magnet assemblies having a top and bottom fixed rotational magnet assembly, and a central reciprocating magnet assembly, connected to a crankshaft. The rotation of the top and bottom fixed magnet assemblies by a polarity switching means, changes their polarity with respect to the reciprocating magnet assembly's polarity. Thus, rotating the fixed magnets exerts either a magnetic pulling force or a magnetic pushing force on the reciprocating magnet assembly. By the synchronized coordination of the rotation of the two fixed magnet assemblies, the reciprocating magnet assembly can be magnetically pulled and simultaneously pushed toward the top and then the bottom of its stroke so as to impart a reciprocating motion to the central, reciprocating magnet assembly. Through the crankshaft this reciprocating motion is transformed into rotary motion.

14 Claims, 4 Drawing Sheets

(56) References Cited

U.S. PATENT DOCUMENTS

| | | | |
|---|---|---|---|
| 11,781,631 B2* | 10/2023 | Herrin | H02K 7/116 74/29 |
| 2006/0001323 A1* | 1/2006 | Gang | B62J 6/06 310/156.01 |
| 2007/0210659 A1* | 9/2007 | Long | H02K 49/10 310/80 |
| 2010/0045119 A1* | 2/2010 | Jackson | H02K 7/1853 310/20 |
| 2010/0308675 A1* | 12/2010 | Thundat | H02K 21/12 310/152 |
| 2010/0323644 A1* | 12/2010 | Bataille | H02K 35/06 455/127.1 |
| 2011/0001381 A1* | 1/2011 | McDaniel | H02K 21/00 310/152 |
| 2011/0198945 A1* | 8/2011 | Nakagawa | H02K 33/16 310/12.25 |
| 2012/0098357 A1* | 4/2012 | Hunstable | H02K 7/075 310/20 |
| 2012/0104765 A1* | 5/2012 | Esteve | H02K 35/02 310/38 |
| 2012/0112565 A1* | 5/2012 | Lee | H02K 33/16 310/20 |
| 2012/0119596 A1* | 5/2012 | Doll | H02K 16/02 310/36 |
| 2013/0015667 A1* | 1/2013 | Fullerton | H02K 21/24 290/1 A |
| 2013/0057086 A1* | 3/2013 | Hein | H01F 7/1844 310/12.19 |
| 2014/0339927 A1* | 11/2014 | Flynn | H02K 33/12 310/20 |
| 2015/0091395 A1* | 4/2015 | Spivak | H02K 33/12 310/20 |
| 2016/0314923 A1* | 10/2016 | Tsuneyoshi | H02K 7/1876 |
| 2018/0131371 A1* | 5/2018 | Liu | H03K 17/94 |
| 2018/0301969 A1* | 10/2018 | Takahashi | H04M 19/04 |
| 2019/0229601 A1* | 7/2019 | Liao | H02K 7/003 |
| 2020/0076288 A1* | 3/2020 | Nerubenko | F03G 7/08 |
| 2023/0246532 A1* | 8/2023 | Haronian | H02K 35/02 310/15 |
| 2024/0022134 A1* | 1/2024 | Chang | H02K 7/06 |

* cited by examiner

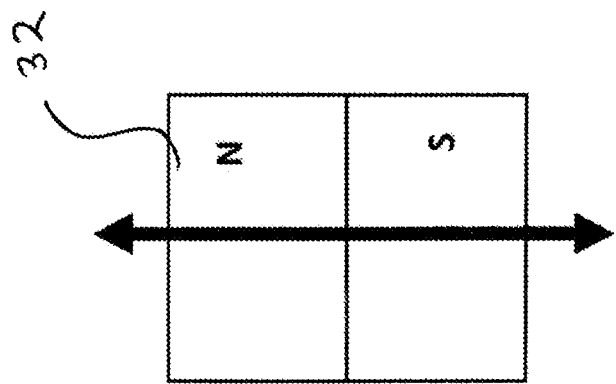
Fig 5
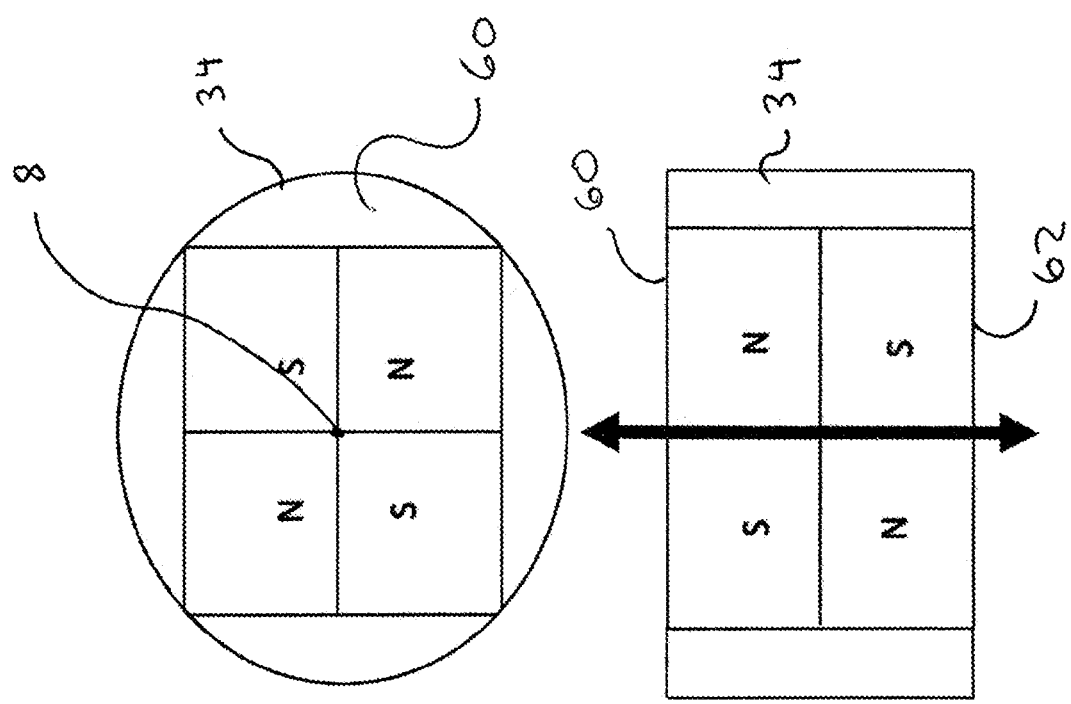
Fig 3
Fig 4

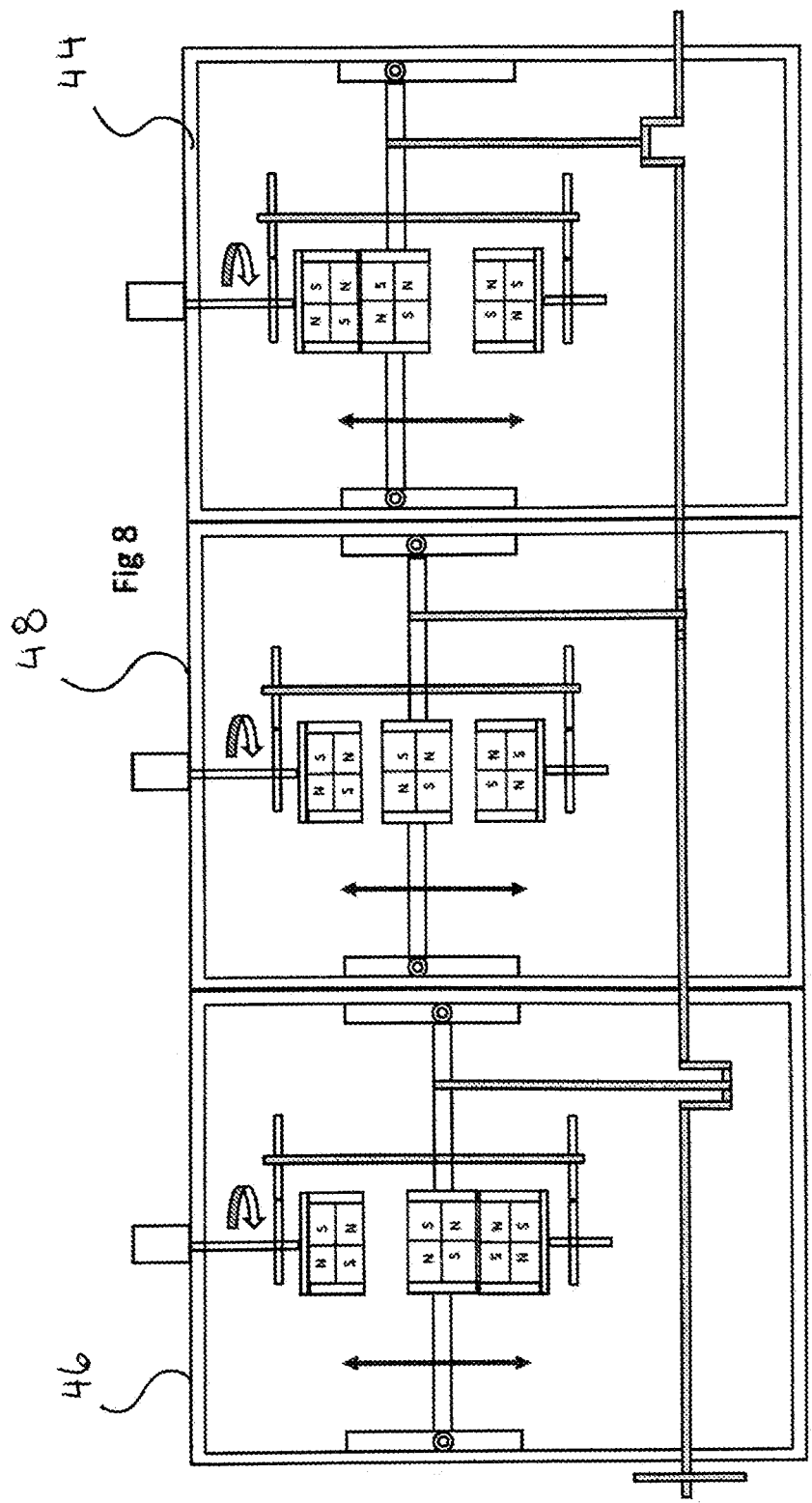

RECIPROCATING MAGNETIC MOTOR

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to reciprocating motors, and more particularly to the conversion of opposing linear magnetic forces into usable rotary motion.

BACKGROUND

Starting in 1878 electricity production, distribution and use began to expand rapidly. The primary cause of this was Thomas Edison's invention of the incandescent light bulb. At the same time a central power station in New York city started producing and distributing electric power using a steam engine driving a generator. This technology spread quickly around the planet and soon electricity would be incorporated in every facet of life. Today there are many forms of electrical generation in use but the need for higher efficiency and lower production cost are still of primary importance in the industry.

The efficiency of an electrical generation system is a very complicate issue. Many factors are involved in the calculations and many different types of electrical generations are possible. The average efficiency of fossil fuel fired generation facilities is around 38%. That means that during operation only 38% of the total energy contained in the fossil fuel is converted to useable electrical power. The rest of the energy in the fuel is lost to heat generated by friction and combustion. Roughly one third of the energy is lost to exhaust heat and another third is lost to cooling systems. Electrical energy produced by solar generation has a conversion efficiency of roughly 20%, that is roughly 20% of the energy in the suns radiation impacting the solar panel is converted to useable electrical energy. The main, and most important difference between the two processes is that the fuel needs to be purchased and the sun's energy is available at no cost.

A need exists, therefore, for a continued search and development of prime movers with ever higher efficiencies and lower operating costs. Additionally a reduction of dangerous emissions polluting, and damaging, the environment further is of critical importance.

Henceforth, a magnetic reciprocation motor that converts liner magnetic forces into a usable rotary output, would fulfill a long felt need in a plethora of mechanical endeavors, including but not limited to vehicular transportation, fluid pumping and electrical generation. This new invention utilizes and combines known and new technologies in a unique and novel configuration to overcome the aforementioned problems and accomplish this.

BRIEF SUMMARY

In accordance with various embodiments, a magnetic reciprocating motor is provided that uses two fixed, rotatable or translatable magnet assemblies that simultaneously impart opposite magnetic forces upon a centrally located moveable magnet assembly so as to cause reciprocating linear motion of the central moveable magnet assembly. This reciprocating motion is changed into a rotary motive output with a crankshaft and gearing.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 3 is a top view of an axially magnetized multi-pole magnet assembly for a rotational embodiment magnetic reciprocating motor;

FIG. 4 is a side view of an axially magnetized multi-pole magnet assembly for a rotational embodiment magnetic reciprocating motor;

FIG. 5 is a side view of an axially magnetized magnet segment;

FIG. 8 is a side view of three rotational embodiment magnetic reciprocating motors with a common crankshaft and fixed magnet polarity switching means.

DETAILED DESCRIPTION OF CERTAIN EMBODIMENTS

Figure 1:
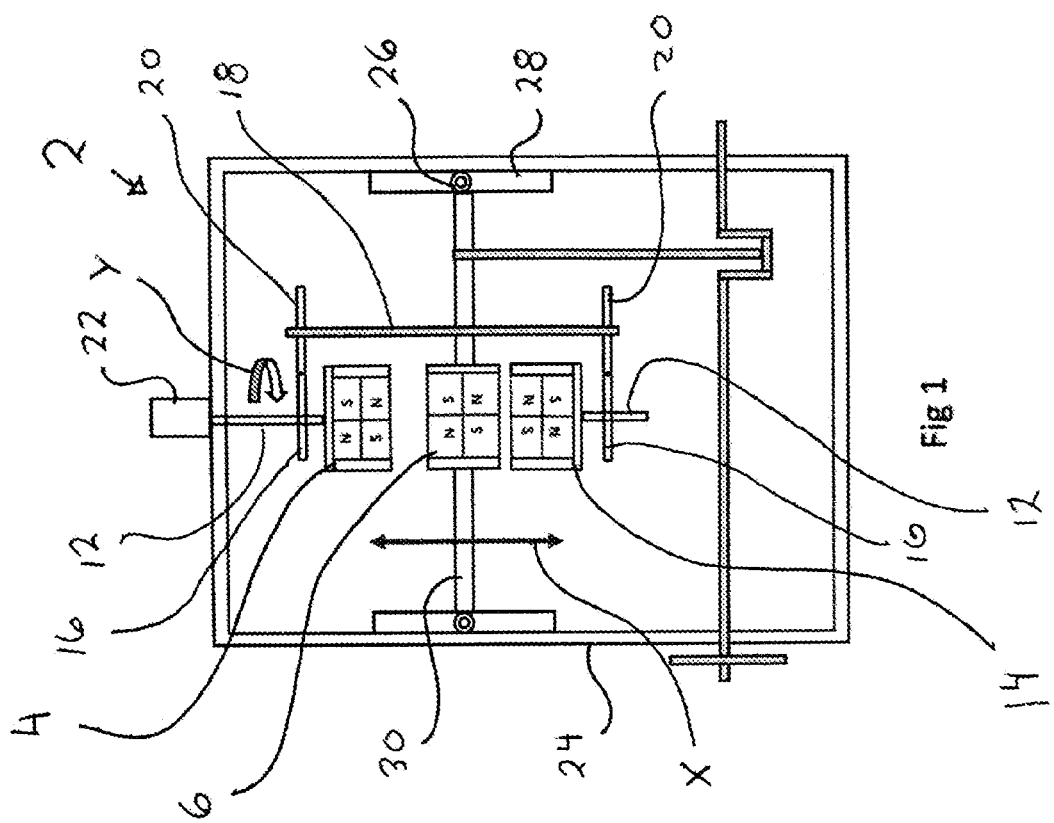
FIG. 1 is a side view of the rotational embodiment magnetic reciprocating motor.

While various aspects and features of both rotational and translational vertically fixed magnet assembly embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Since the magnetic motor can be oriented for reciprocating motion in any plane, (vertical, horizontal or a combination thereof,) the terms "vertically fixed" and "horizontally rotational/translational" refer only to the orientation depicted in the illustrations herein and would be modified accordingly with different orientations of the magnetic reciprocating motor.

The invention uses the inherent energy available in a magnetic field to create a linear motion which is then turned into rotary motion by use of a crankshaft. The advantage of the invention is that the energy contained in the magnetic field is converted to useable mechanical energy in a process that does not require much external energy. This process is very similar to the processes used in solar, wind, tidal and geothermal energy conversion methods. The mechanism of the invention is capable of converting the energy in the magnetic field at an efficiency up to 90%.

Figure 2:
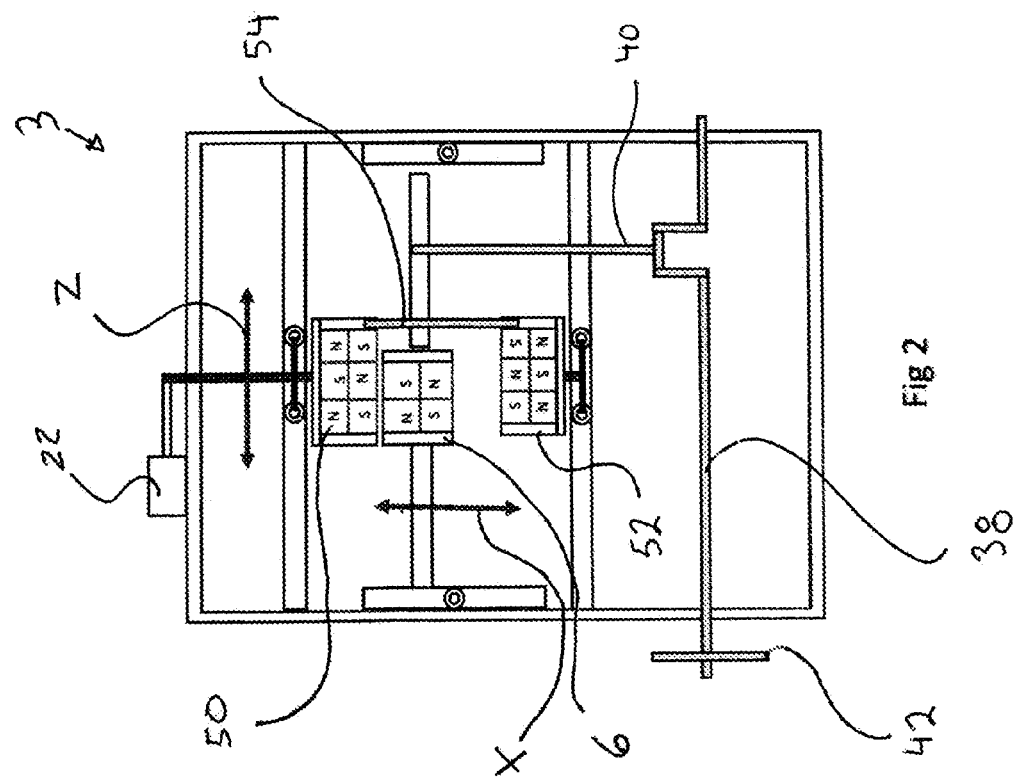
FIG. 2 is a side view of the translational embodiment magnetic reciprocating motor.

The present invention relates to a novel design for a magnetic reciprocating motor (motor). There are two embodiments presented. The preferred embodiment motor 2 involves the rotational movement of its two vertically fixed magnet assemblies (FIG. 1). The alternate embodiment motor 3 involves the horizontally translational movement of its two vertically fixed magnet assemblies (FIG. 2).

Looking at FIGS. 1 and 8, the preferred embodiment motor can best be explained. The motor 2 has a housing 24 having top, bottom, and side walls, defining an enclosed cavity. This motor 2 has three magnet assemblies to generate linear motion. There are two vertically fixed magnet assemblies 4, 14 and one central reciprocating magnet assembly 6 that are in a spaced, stacked configuration. The axes and midpoints 8 of the fixed magnet assemblies 4, 14 and the reciprocating magnet assembly 6 are colinear. (See FIG. 3) The fixed magnet assemblies reside in parallel horizontal planes but are fixed vertically. These three magnet assemblies are attached to the motor's housing 24. The upper fixed magnet 4 and lower fixed magnet 14 have stub shafts 12 extending from their midpoints that have a first gear 16 located thereon. Connecting these fixed magnets 4, 14 is a synchronizing shaft 18 with a second gear 20 at either of its ends that meshingly engages one of the first gears 16. The sizes and tooth count of the two first gears 16 are identical and the sizes and tooth count of the two second gears 20 are also identical. These shafts and gearing assembly constitutes the fixed magnet assemblies' synchronization means. It is well known in the art that the synchronization means may be made of a plethora of different mechanical connectors including timing gears, timing chains, flex drive shafts, belts, pulleys and the equivalent.

These two fixed magnet assemblies 4, 14 are synchronized to rotate the identical amount at the identical speed and identical time through this synchronization means. Attached to one of the fixed magnet assemblies 4 or 14 is a polarity reversing means 22 that rotates both of the magnet assemblies 4, 14 simultaneously through the shaft and gearing system as indicated by directional arrow Y. Each fixed magnet's stub shaft is held in place by a low friction flanged bearing mounted on the motor housing 24. The polarity reversing means 22 is any rotational source that is connected to the stub shaft 12, most preferably this is an electric stepping motor. This polarity reversing means provides the only external energy input required.

The reciprocating magnet assembly 6 travels a total of three inches between the two fixed magnets 4, 14 in the direction indicated by directional arrow X. The forces (energy) in a magnetic field fall off as the square of the distance between the magnets, the forces between the fixed magnets at three inches are minimal. The reciprocating magnet assembly 6 has a pair of stabilizing arms 30 extending outward 180 radial degrees from the reciprocating magnet assembly 6. These stabilizing arms 30 attach the reciprocating magnet assembly 6 to the aluminum housing by low friction linear bearings 26, and its reciprocating path of travel is stabilized by the linear bearing guides 28 which the linear bearings 26 travel back and forth along, and are mounted on the inside wall of the housing 24. The reciprocating magnet assembly 6 never contacts either of the fixed magnet assemblies 4, 14 such that there will always be an air gap between magnet assemblies.

The design of the two vertically fixed magnet assemblies and the central, moving magnet assembly is critical to the operation of the magnetic reciprocating motor. Looking at FIGS. 3-5 it can be seen that all three of the magnet assemblies (fixed rotational, and reciprocating) are constructed of a grouping of axially magnetized magnet segments 32 (FIG. 5) that are arranged into a casing 34 so as to form a right cylinder. Each magnet assembly has a planar top face 60 and a planar bottom face 62. (FIGS. 3 and 4) These magnet assemblies are all arranged with the adjacent multiple axially magnetized magnet segments 32 having opposing magnetic poles. Thus, each magnet assembly has more than one magnet arranged in a north-south pattern, called axially magnetized multi-pole magnet assemblies. (magnet assemblies)

Figure 6:
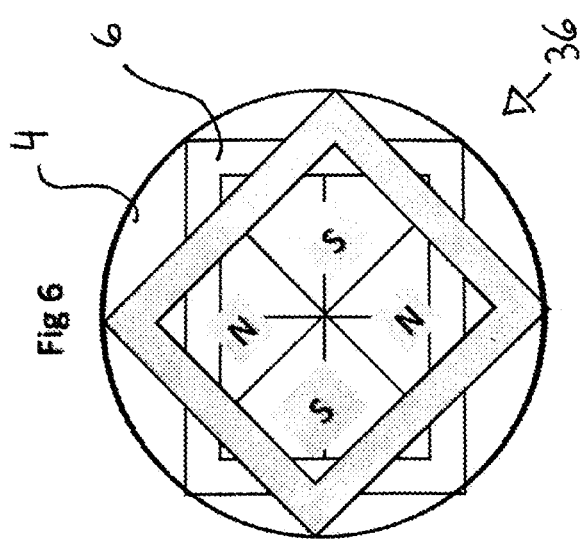
FIG. 6 is a top view of a rotational magnet assembly shown rotated 45 degrees above a cylindrical reciprocating magnet assembly.

Making the magnet assemblies this way makes it possible to change the direction of the reciprocating motion forces acting on the middle reciprocating magnet assembly 6 by simultaneously rotating the vertically fixed magnet assemblies 4, 14. FIG. 6 illustrates a top view of a cylindrical magnet stack 36 as the fixed top magnet 4 is rotated. As can be seen, by rotating the two fixed magnet assemblies 4, 14 by 90 radial degrees, the face of the fixed magnet 4 or 14 that the top or bottom face of the reciprocating magnet 6 approaches, will be either attracting in polarity across all of its magnet segments or repelling in polarity across all of its magnet segments. Thus, rotating the fixed magnets 4, 14 exerts either a magnetic pulling force or a magnetic pushing force on the reciprocating magnet. By the synchronized coordination of the rotation of the two fixed magnets 4, 14 the reciprocating magnet assembly 6 can be magnetically pulled toward the top of its stroke by the top magnet assembly 4 and pushed toward the top of its stroke at the same time by the bottom magnet assembly 14. (See FIG. 8 right motor 44.) Then, as it approaches its top dead center (the furthest the reciprocating magnetic assembly 6 can travel) the polarity changing means can rotate the fixed magnets 4, 14 so the reciprocating magnet assembly 6 can be magnetically pushed toward the bottom of its stroke by the top magnet assembly 4 and pulled toward the bottom of its stroke at the same time by the bottom magnet assembly 14 until it reaches its bottom dead center. (See FIG. 8 motor 46.) Continued synchronized rotation of the top and bottom magnet assemblies 4, 14 will impart a reciprocating motion to the central, reciprocating magnet assembly 6. The faces of the magnet assemblies never contact each other. In the preferred embodiment the reciprocating stroke is approximately three inches high and the minimum spacing between the magnet faces is ⅛ inch.

The up and down motion of the reciprocating magnet assembly 6 is connected to a crankshaft 38 by an offset connecting rod assembly 40 as is a well-known mechanical system, especially in the field of gas powered motors. This crankshaft and connecting rod will produce rotary motion at the end of the crankshaft, from the vertical reciprocating motion of the connected reciprocating magnet assembly 6. This in turn can be used by various mechanical systems to produce electricity or perform work, whatever is required. There is a weighted flywheel 42 located at least on one end of the crankshaft 38. It is not necessary to ensure the reciprocating motion of the motor is continuous, rather it just smooths out the speed of the motor.

The intensity of the magnetic forces in the motor is a function of the square of the distance ($I=1/d^2$). Thus, the weakest magnetic forces acting on the central reciprocating magnet assembly 6, occurs when it is at the midpoint of its stroke and equidistant from both the top magnet assembly 4 and the bottom magnet assembly 14. (See FIG. 8's middle motor 48.) This is not a sticking point of the cycle, but the inertia of the spinning mass of the flywheel 42 on the crankshaft 38 provides rotational momentum to maintain the speed of the reciprocating magnet assembly 6 throughout the stroke of the reciprocating magnet assembly. Additionally, if multiple motors are joined or additional magnet assemblies are added onto the crankshaft 38 (as shown in FIG. 8) their offset connecting rod assemblies can be indexed 120 radial degrees apart on the crankshaft 38. Thus, at the weakest magnetic point of any reciprocating magnet assembly 6 there are additional mechanical forces provided in the direction the reciprocating magnet assembly 6 was moving to ensure there is a smooth constant operating speed of the motor's reciprocating motion. FIG. 8 shows such a system with three motors connected with a common crankshaft.

Figure 7:
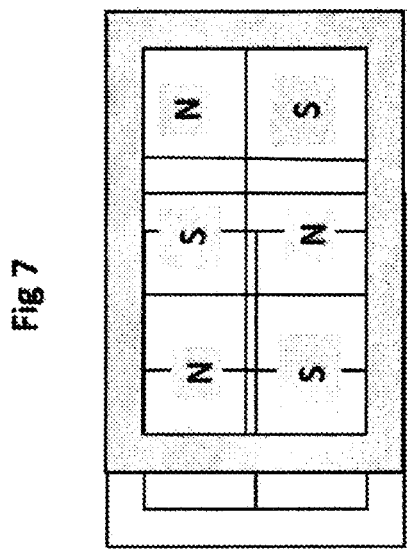
FIG. 7 is a top view of a translational magnet assembly shown rotated 45 degrees above a cuboid reciprocating magnet assembly.

Looking now at the alternate embodiment magnetic reciprocating motor 3 of FIGS. 2 and 7, uses a horizontally translational movement of its two vertically fixed magnet assemblies (FIG. 2) to cause the reciprocating vertical movement of the reciprocating central magnet assembly 6. Thus, the theory of operation remains the same, wherein there are three magnet assemblies also made of adjacent multiple axially magnetized magnet segments 32 having opposing magnetic poles. (FIG. 5) Thus, each magnet assembly has more than one magnet arranged in a north-south pattern, called axially magnetized multi-pole magnet assemblies.

The reciprocating magnet assembly is arranged into a casing 34 so as to form a right cylinder as in the preferred embodiment. (FIGS. 3 and 4) However, the fixed upper and lower magnet assemblies 50, 52 are approximately 50% longer than their counterparts in the preferred embodiment motor 2 and contains 50% more magnet segments. They are encased into a cuboid configuration. Their width does not change and approximates the width of the reciprocating magnet assembly 6, but their length is half again as long as that of the reciprocating magnet assembly's. There is a polarity changing means 22 that can horizontally translate the fixed magnets 50, 52 in the direction of the arrow Z so the reciprocating magnet assembly 6 can be magnetically pushed toward the bottom of its stroke by the top magnet assembly 50 and pulled toward the bottom of its stroke at the same time by the bottom magnet assembly 52 as indicted by arrow X. The magnet segments are arranged in the fixed magnet assemblies such that there are some central segments in continuous use whether repelling or attracting the reciprocating magnet assembly 6. Continued synchronized translation of the top and bottom magnet assemblies 50, 52 will impart a reciprocating motion to the central, reciprocating magnet assembly 6.

Here, the polarity changing means may be a reciprocating stepping motor or a rotational stepping motor with mechanical connections to change rotary motion into reciprocating motion as is well known in the field. The two fixed magnet assemblies 50, 52 are connected by a simple mechanical linkage 54 such that the two fixed magnet assemblies 50, 52 move in unison. In the same fashion as the preferred embodiment motor 2, the polarities at the faces of the fixed magnet assemblies 50, 52 and the reciprocating magnet 6 are aligned to either attract or repel each other depending on the timing of the reciprocation cycle.

Other than alternating the magnetic fields of their vertically fixed magnet assemblies with different motions, both the preferred embodiment and the alternate embodiment share identical principals of operation and are constructed of three magnet assemblies (two of which are vertically fixed but rotatable) or three cuboid magnet assemblies (two of which are vertically fixed but horizontally translatable.) The cuboid magnet assemblies have six rectangular faces oriented at right angles to each other.

While certain features and aspects have been described with respect to exemplary embodiments, one skilled in the art will recognize that numerous modifications are possible. Moreover, while the procedures of the methods and processes for building, assembling and using the devices described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. A magnetic reciprocating motor, comprising:
   a motor housing having top, bottom and side walls;
   a stacked arrangement of three magnet assemblies, made of a central reciprocating magnet assembly with a first face and a second face, a first magnet assembly residing in a first horizontal plane and fixed vertically, and a second magnet assembly residing in a second horizontal plane parallel to said first horizontal plane and fixed vertically;
   wherein each of said three magnet assemblies is connected to said motor housing and said reciprocating magnet assembly has a first fixed magnet assembly located in a spaced configuration adjacent said first face, and a second fixed magnet assembly located in a spaced configuration adjacent said second face;
   a polarity switching means connected to said first fixed magnet assembly for the movement of said first fixed magnet assembly and said second fixed magnet assembly;
   a synchronizing means connected to said polarity switching means and connected between said first fixed magnet assembly and said second fixed magnet assembly to ensure equal, synchronized movement of said first fixed magnet assembly and said second fixed magnet assembly relative to each other;
   at least one stabilizing arm extending from the reciprocating magnet assembly and attaching with a linear bearing to a linear bearing guide mounted on the inside wall of said motor housing;
   a crankshaft rotationally supported on said motor housing walls; and
   a connecting rod assembly connected between said reciprocating magnet assembly and said crankshaft.

2. The magnetic reciprocating motor of claim 1 wherein said first magnet assembly is rotatable within said first plane and said second magnet assembly is rotatable within said second plane.

3. The magnetic reciprocating motor of claim 2 further comprising:
   a flywheel affixed to one end of said crankshaft.

4. The magnetic reciprocating motor of claim 3 wherein said all three magnet assemblies are constructed of a grouping of axially magnetized magnet segments arranged into a casing with a planar first face and a planar second face.

5. The magnetic reciprocating motor of claim 4 wherein each said grouping of axially magnet segments have adjacent multiple axially magnetized magnet segments with opposing magnetic poles such that each said magnet assembly has more than one magnet arranged in a north-south pattern forming an axially magnetized multi-pole magnet assembly.

6. The magnetic reciprocating motor of claim 1 wherein said first magnet assembly is translatable along said first plane and said second magnet assembly is translatable along said second plane.

7. The magnetic reciprocating motor of claim 6 further comprising:
   a flywheel affixed to one end of said crankshaft.

8. The magnetic reciprocating motor of claim 7 wherein said all three magnet assemblies are constructed of a grouping of axially magnetized magnet segments arranged into a casing with a planar first face and a planar second face.

9. The magnetic reciprocating motor of claim 8 wherein each said grouping of axially magnet segments have adjacent multiple axially magnetized magnet segments with opposing magnetic poles such that each said magnet assembly has more than one magnet arranged in a north-south pattern forming an axially magnetized multi-pole magnet assembly.

10. A magnetic reciprocating motor, comprising:
    a motor housing having top, bottom and side walls;
    a stacked arrangement of three magnet assemblies, made of a central reciprocating magnet assembly with a first face and a second face, a first fixed rotatable magnet assembly, and a second fixed rotatable magnet assembly;
    wherein each of said three magnet assemblies is connected to said motor housing and said reciprocating magnet assembly has a fixed rotatable magnet assembly located in a spaced configuration adjacent said first face, and a second fixed rotatable magnet assembly located in a spaced configuration adjacent said second face;
    a polarity switching means rotatably connected to said first fixed rotatable magnet assembly for the rotation of said first fixed rotatable magnet assembly and said second fixed rotatable magnet assembly;
    a synchronizing means connected to said polarity switching means and connected between said first fixed rotatable magnet assembly and said second fixed rotatable magnet assembly to ensure equal, synchronized rotation of said first fixed rotatable magnet assembly and said second fixed rotatable magnet assembly relative to each other;
    at least one stabilizing arm extending from the reciprocating magnet assembly and attaching with a linear bearing to a linear bearing guide mounted on the inside wall of the motor housing;
    a crankshaft supported by said motor housing walls; and
    a connecting rod assembly connected between said reciprocating magnet assembly and said crankshaft.

11. The magnetic reciprocating motor of claim 10 further comprising:
- a first midpoint on said first fixed rotatable magnet assembly;
- a second midpoint on said second fixed rotatable magnet assembly;
- a third midpoint on said reciprocating magnet assembly; and
- wherein said first, second and third midpoints are colinear.

12. The magnetic reciprocating motor of claim 11 further comprising:
- a flywheel affixed to one end of said crankshaft.

13. The magnetic reciprocating motor of claim 12 wherein said all three magnet assemblies are constructed of a grouping of axially magnetized magnet segments arranged into a casing with a planar first face and a planar second face.

14. The magnetic reciprocating motor of claim 13 wherein each said grouping of axially magnet segments have adjacent multiple axially magnetized magnet segments with opposing magnetic poles such that each said magnet assembly has more than one magnet arranged in a north-south pattern forming an axially magnetized multi-pole magnet assembly.

\* \* \* \* \*